United States Patent
Kaplan et al.

(10) Patent No.: US 11,014,338 B2
(45) Date of Patent: May 25, 2021

(54) WINDSCREEN AND DEVICE FOR DRIVING ASSISTANCE

(71) Applicant: SAINT-GOBAIN GLASS FRANCE, Courbevoie (FR)

(72) Inventors: Benjamin Kaplan, Aachen (DE); Klaus Schmalbuch, Aachen (DE); Stefan Droste, Herzogenrath (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 125 days.

(21) Appl. No.: 16/342,428

(22) PCT Filed: Oct. 17, 2017

(86) PCT No.: PCT/FR2017/052846
§ 371 (c)(1),
(2) Date: Apr. 16, 2019

(87) PCT Pub. No.: WO2018/073527
PCT Pub. Date: Apr. 26, 2018

(65) Prior Publication Data
US 2019/0248113 A1      Aug. 15, 2019

(30) Foreign Application Priority Data
Oct. 17, 2016   (FR) ...................................... 1660037

(51) Int. Cl.
*B60R 11/04*     (2006.01)
*B32B 17/10*     (2006.01)
(Continued)

(52) U.S. Cl.
CPC .. *B32B 17/10165* (2013.01); *B32B 17/10036* (2013.01); *B32B 17/1077* (2013.01);
(Continued)

(58) Field of Classification Search
None
See application file for complete search history.

(56) References Cited

U.S. PATENT DOCUMENTS

| 6,132,882 A | 10/2000 | Landin et al. |
| 2004/0232363 A1* | 11/2004 | Sautter .................... B60S 1/084 250/573 |

(Continued)

FOREIGN PATENT DOCUMENTS

WO    WO 2007/079995 A2    7/2007

OTHER PUBLICATIONS

International Search Report as issued in International Patent Application No. PCT/FR2017/052846, dated Jan. 5, 2018.

*Primary Examiner* — Eileen M Adams
(74) *Attorney, Agent, or Firm* — Pillsbury Winthrop Shaw Pittman LLP

(57) ABSTRACT

A laminated motor-vehicle windshield includes two glass sheets that are joined together by an interlayer made of a thermoplastic of refractive index $n_1$. The thermoplastic interlayer includes a cut-out section in the upper portion of the windshield. The cut-out section is filled with a multilayer film forming a waveguide for guiding waves from a bottom point of entrance of light radiation on the face of the windshield exposed to the exterior of the vehicle to a top point of exit of the radiation on the face of the windshield arranged toward the passenger compartment of the vehicle. The multilayer film includes layers of a first material of refractive index $n_2$ such that $n_1 \geq n_2$ and of a second material that at least partially reflects the light radiation. The second material is placed on either side of the layer of first material to confine, in the latter, the light radiation.

23 Claims, 1 Drawing Sheet

Figure 1:
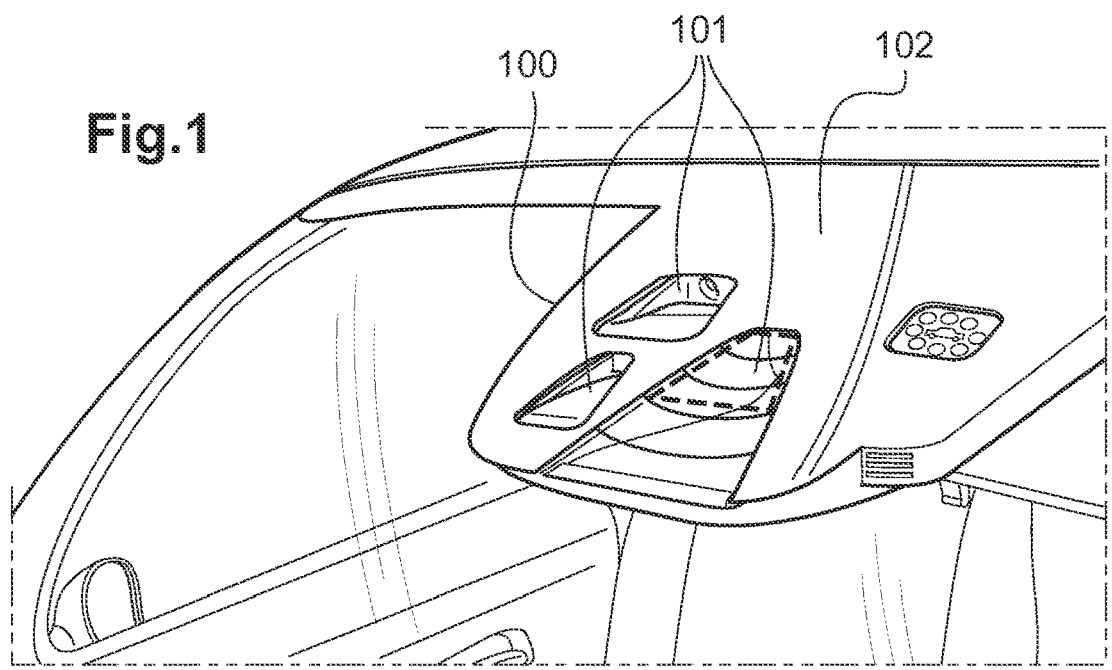

(51) Int. Cl.
*B60J 1/00* (2006.01)
*B60J 1/02* (2006.01)
*B60R 11/00* (2006.01)

(52) U.S. Cl.
CPC .. *B32B 17/10174* (2013.01); *B32B 17/10761* (2013.01); *B60J 1/00* (2013.01); *B60J 1/02* (2013.01); *B60R 11/04* (2013.01); *B32B 2307/418* (2013.01); *B32B 2605/006* (2013.01); *B60R 2011/0026* (2013.01)

(56) References Cited

U.S. PATENT DOCUMENTS

| | | | |
|---|---|---|---|
| 2008/0145661 A1* | 6/2008 | Medwick | C03C 19/00 428/409 |
| 2009/0161109 A1 | 6/2009 | Wolf et al. | |
| 2014/0372020 A1* | 12/2014 | Stein | G01C 21/3644 701/410 |
| 2015/0294169 A1* | 10/2015 | Zhou | G06F 3/013 348/148 |
| 2016/0144797 A1 | 5/2016 | Hoellt et al. | |
| 2017/0361579 A1* | 12/2017 | Chen | B32B 27/22 |

* cited by examiner

WINDSCREEN AND DEVICE FOR DRIVING ASSISTANCE

CROSS REFERENCE TO RELATED APPLICATIONS

This application is the U.S. National Stage of PCT/FR2017/052846, filed Oct. 17, 2017, which in turn claims priority to French Patent Application No. 1660037 filed Oct. 17, 2016, the entire contents of all applications are incorporated herein by reference in their entireties.

The invention relates to a glazing, in particular a windshield, allowing image-data to be captured in a motor vehicle in association with a camera system in particular of the ADAS (Advance Driver Assistance System) type. The invention also describes a device combining said glazing (said windshield) and said camera for such a capture of information.

Automotive glazings and the associated technology are constantly evolving, in particular in order to improve safety. Advanced driver assistance systems (or ADAS) are an important innovation. According to the general principle, cameras placed behind the windshield allow these ADAS to assist the driver while he is driving. Such an ADAS device may in particular have the following functions, the list below not being exhaustive:
  to warn the driver when the vehicle unintentionally departs from its lane;
  to signal an emergency stop;
  to improve night vision;
  to allow a 360 degree view via control screens visible to the driver;
  to recognize road signs installed on the edge of the road;
  to guarantee a precise detection of the distance and of objects, in a two- or even three-dimensional mode (in particular via a stereoscopic effect, for example using a plurality of cameras).

Most conventionally, the device comprises at least one camera placed behind the windshield of the vehicle. In present-day versions of such devices, there is a problem with bulk. Specifically, the space available on the front glazing of a vehicle for such devices is very limited because they must not obstruct the view of the driver, for obvious safety reasons. Such a zone 100, sometimes called Y0 in the field, is conventionally located in the upper central portion of the windshield as indicated in the appended FIG. 1. In this zone 100, the one or more cameras are oriented with a certain angle with respect to the surface of the windshield. In particular, the objective and the (CCD or CMOS) image sensor that is coupled thereto are oriented directly toward the image-capture zone, in a direction almost parallel to the ground, i.e. only slightly inclined toward the road, as illustrated in the appended figures. In other words, the camera is oriented toward the road with an angle that is small, and suitable for providing the aforementioned functions.

Practically, regarding the windshield, on account of the size of the objective, of the sensor of the camera and of its housing, for each camera to be able to see a suitable field of view it is therefore necessary, for each of said cameras, for the collected exterior beam (or rather all of the beams collected in a pre-set solid angle) to pass through a specific window 101 of trapezoidal shape on the windshield, such as illustrated by the appended FIG. 1.

Given that the windshield itself, in the image-capture zone, makes a relatively small angle to the road, the implementation of a camera of small size therefore requires there to be available, on the windshield, a trapezoidal window 101 of relatively large size, and the extent of which increases with the size of the solid angle to be observed, as illustrated in the appended FIG. 1.

Such a configuration furthermore implies the use of a black coating 102, such as a layer of black lacquer or enamel, on all the area of the glazing placed facing the device incorporating the ADAS camera, including its housing, so as to hide the latter.

Furthermore, if a plurality of cameras are associated, for example in order to provide a plurality of functions such as described above, or even for a reconstruction and/or an analysis in a (stereoscopic) three-dimensional mode, it in addition proves to be necessary to separate the various trapezoidal zones corresponding to each camera from one another, as illustrated in FIG. 1. In such a case in particular, the black area 102 printed on the glazing may be of very large dimensions, in proportions liable to decrease in particular the overall field of view of the driver through the windshield. In most present-day embodiments incorporating a plurality of ADAS cameras, it is substantially all the area of the upper central portion of the windshield that must be covered with a black printed layer, as illustrated in the appended FIG. 1.

The aim of the present invention is to provide a solution allowing the problems described above to be solved and in particular allowing the problems of bulk described above to be avoided, by decreasing in particular the black area present on the windshield to isolate or mask the ADAS cameras present behind the glazing.

In particular, the preceding problem has been solved by modifying the orientation of the optics of the camera so as to tilt the latter by an angle β toward the vertical.

More precisely, the present invention relates to a laminated windshield for a motor vehicle, comprising two glass sheets that are joined together by an interlayer made of a thermoplastic of refractive index $n_1$, wherein:
  said thermoplastic interlayer comprises a cut-out section in the upper portion of the windshield;
  said cut-out section is filled with a multilayer film forming a waveguide for guiding waves from a bottom point of entrance of light radiation on the face of the windshield exposed to the exterior of the vehicle to a top point of exit of said radiation on the face of the windshield arranged toward the passenger compartment of the vehicle; and
  said multilayer film comprises layers of a first material of refractive index $n_2$ such that $n_1 \geq n_2$ and of a second material that reflects at least some, and preferably substantially all, the light radiation, said second material being placed on either side of the layer of first material in order to confine, in the latter, said light radiation.

Certain advantageous but nonlimiting embodiments of the present invention are described below, which may of course be combined with one another where needs be:
  The refractive refractive index $n_2$ is lower than the refractive index $n_1$.
  The refractive refractive index $n_2$ is lower than the refractive index $n_1$ by at least 0.05 and preferably by at least 0.1.
  The interlayer is a PVB interlayer.
  The first material is chosen from optionally fluorinated, aliphatic urethane acrylate polymers.
  The first material is chosen from optionally fluorinated, aliphatic urethane acrylate polymers.

The light-reflecting second material is a material consisting of a thermoplastic of refractive index $n_3$, chosen in such a way that $n_2 > n_3$.

The refractive refractive index $n_3$ is lower than the refractive index $n_2$ by less than 0.05.

The interlayer is made of PVB, the first material has a refractive index $n_2$ comprised between 1.32 and 1.43 and the second material has a refractive index $n_3$ comprised between 1.31 and 1.42.

The first material has a refractive index $n_2$ comprised between 1.32 and 1.43 and the refractive index $n_3$ is comprised between 1.31 and 1.42.

The second material is chosen from optionally fluorinated, aliphatic urethane acrylate polymers.

Alternatively, the light-reflecting second material may be a stack consisting of at least one thin layer of a metal and/or of inorganic materials in particular chosen from oxides or nitrides.

The light-reflecting second material consists of a silver layer or of a stack of thin layers comprising at least one silver layer.

Said cut-out section is normally located in a central upper zone of the glazing, which zone is preferably wiped by the windshield wipers.

For example, said cut-out section is of rectangular shape.

The invention also relates to a device for capturing, through a windshield, images issued from a zone of capture of light radiation from a bottom point of entrance of the light radiation on that face of a windshield which is exposed to the exterior of the vehicle to a top point of exit of said radiation on that face of the windshield which is arranged toward the passenger compartment of the vehicle, said device being characterized in that it comprises:

a camera, in particular an ADAS camera, comprising an objective and an image sensor; and a windshield such as described above;

wherein said camera is placed in the passenger compartment behind said windshield level with said top point of exit of said radiation, so as to receive the light radiation issued from said capture zone, after it has passed through said windshield.

FIG. 1 illustrates a perspective view of an image-capturing device that is currently commercially available and as described above.

Figure 2:
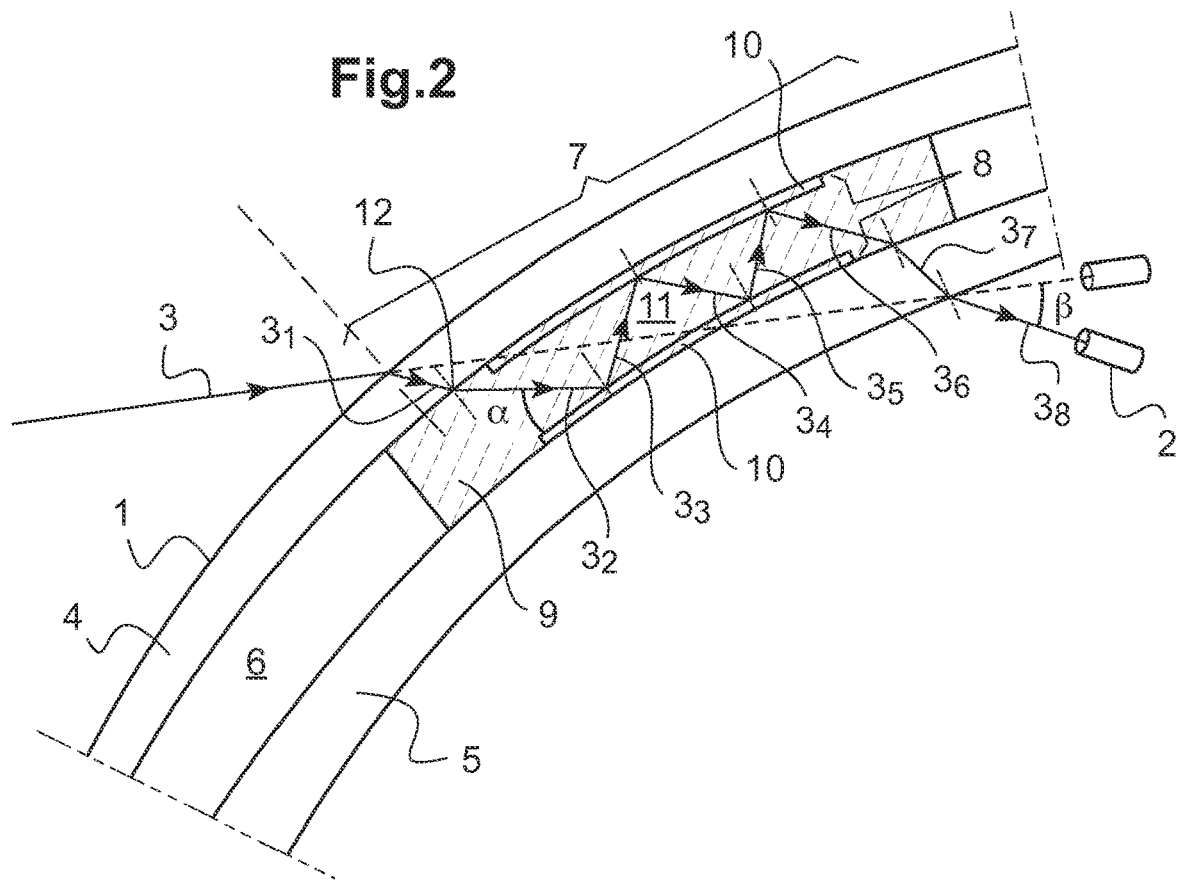

FIG. 2 schematically shows a sagittal cross section of a windshield according to the invention, and the path of a light ray from the exterior of the vehicle to the objective of a camera, for example an ADAS camera, placed behind the windshield.

More particularly, FIG. 2 illustrates one embodiment of the present invention, in more detail but nonlimitingly.

In this figure, a sagittal cross-sectional plane of a laminated glazing has been shown. The arrows $3_1$ to $3_8$ illustrate the path followed in the windshield by an initial light ray 3, coming from the exterior environment of the vehicle, and in particular from the zone of the road that it is desired to observe with an ADAS camera 2 placed in a higher up portion of the windshield 1, from a bottom portion of the windshield. Of course, the terms "bottom portion" and "top portion" used in the present invention are relative and simply indicate that the point of entrance of the light radiation is located in a region of the windshield that is substantially lower, in the vertical direction, than its point of exit, as illustrated in FIG. 2.

By light radiation, what is meant in the context of the present invention is all the light rays arriving in a certain solid angle and that it is sought to capture via the camera 2.

In FIG. 2, this radiation has been represented, for the sake of clarity, by a single beam 3.

As illustrated in FIG. 2, the beam 3 of exterior (to the vehicle) light normally captured by the camera 2 arrives with an angle of incidence on the windshield that is very flat with respect to the horizontal, so that installation of the camera 2 directly on the back of the windshield 1 conventionally requires, if said beam is to be captured, the camera to also be positioned in such a direction, i.e. its objective to itself make a very flat angle to the road and to the interior surface of the windshield, as represented by the dashed line in FIG. 2.

As indicated above with reference to FIG. 1, in such a configuration, the black enameled or lacquered area 102 formed on the glazing to hide the installation may be of very large dimensions, to the point of possibly notably decreasing the overall field of view of the driver through the windshield itself.

The glazing 1 shown in FIG. 2 is a conventional laminated windshield comprising a first glass sheet 4 and a second glass sheet 5, the two glass sheets being joined together by an interlayer 6 made of a thermoplastic, and most often made of polyvinyl butyral (PVB). The windshield is obtained by hot lamination of the elements 4, 5 and 6 in a way that is well-known and conventional. Without departing from the scope of the invention, the interlayer may of course comprise a plurality of sheets made of thermoplastics of different natures, for example of different hardnesses in order to provide an acoustic function, such as for example described in the publication U.S. Pat. No. 6,132,882, in particular a set of PVB sheets of different hardnesses. Likewise, one of the glass sheets may be thin with respect to the thicknesses conventionally used. The interlayer may also have according to the invention a wedge shape, in particular with a view to a head-up display (HUD) application. Furthermore, one of the sheets of the interlayer may be bulk-tinted.

In the interlayer 6, from that zone 7 of the glazing which is arranged in the region of the final position of the camera, a cut-out is taken before the lamination operation, so as to replace a section 11 of the latter with a multilayer film 8 according to the invention. The zone 7 is of very small size, with respect to the size of the windshield. The section 11 corresponds to the hatched zone in FIG. 2. The inserted multilayer film 8 comprises a plurality of successive layers including a first material taking the form of a plastic layer 9 positioned at the center of the film and of refractive index $n_2$ lower than or equal to, and preferably lower than, the refractive index $n_1$ of the material from which the interlayer 6 is made. This first material, in layer 9, of index $n_2$ may in particular be another plastic (a polymer), in particular a plastic having properties that allow it to adhere to the surface of the glass or to other plastics.

In particular, the material 9 is advantageously and preferably chosen in such a way that its refractive index $n_2$ is significantly lower than that of the material from which the interlayer sheet 6 is made. By significantly lower, what is meant is an index difference of at least 0.05 and preferably of at least 0.1.

In particular and for example, if the material 6 is a thermoplastic of the PVB type, the refractive index of which is about 1.48, the material chosen for the material 9 may advantageously be chosen from acrylate polymers, in particular optionally fluorinated, aliphatic urethane acrylate polymers, the refractive index of which may vary between 1.31 and 1.42 depending on the formulation. Such adhesives polymers are for example sold by Nordland under the references NOA 1315, NOA 132, NOA 1327, NOA 1328, NOA 133, NOA 13685, NOA 1375, NOA 138, NOA 142.

On either side of this first material of refractive index $n_2$ are arranged two layers 10 of a second material allowing the radiation entering into the section 11 to be confined via multiple internal reflections at the interface between the first and second materials.

According to a first preferred example embodiment, this second constituent material of the layers 10 is of organic nature, in particular is a plastic polymer and preferably is a thermoplastic.

According to this embodiment, the material 10 has a refractive index $n_3$ that is lower and preferably slightly lower than that ($n_2$) of the layer of the material 9.

By slightly lower, what is meant is an index difference, between the indices $n_2$ and $n_3$, of less than 0.05 and preferably of less than 0.04, more preferably of less than 0.03 or indeed of less than 0.02, or even of less than 0.01.

According to another alternative embodiment, the second material may be inorganic. It may in particular be an inorganic layer, in particular, or a stack of thin layers, allowing a light ray striking its surface to be reflected.

For example, the light-reflecting second material is a stack consisting of at least one thin layer of a metal and/or of inorganic materials in particular chosen from oxides or nitrides.

According to one possible embodiment, the light-reflecting second material consists of a metal layer or of a stack of thin layers comprising at least one metal layer. This metal is preferably silver. In the preceding configurations, the thickness of the silver layer is for example comprised between 10 nm and 50 nm.

The multilayer film 8 is thus configured, using conventional optical techniques, so that the initial light ray 3 enters at a lower end of the section 11 (bottom point of entrance of the light) with a suitable angle α, in order then to undergo multiple, substantially total, internal reflections at the interface between the materials 9 and 10 as indicated by the arrows $3_2$ to $3_3$. As illustrated in FIG. 2, according to the invention, the initial ray therefore propagates to the other end of the multilayer film 8 (top point of exit of the light) without loss of information, by multiple reflections, along the cut-out section 11, in the material 9 flanked by the layers or strips of the material 10.

According to the first example embodiment described above, the multilayer film 8 thus acts as a waveguide, exploiting the refractive properties of light at the interface between two materials of different indices, according to principles that are already well known in particular in the field of optical fibers.

According to the second example described above, the metal layers flanking the material 9 play the role of a mirror and allow, in the same way as above, the light to be reflected and confined along the section 11 to a point of exit arranged in a top portion of the glazing.

According to one particular and advantageous aspect of the present invention, the index difference between the single (or more than one) thermoplastic(s) from which the interlayer 6 (of index $n_1$) is made and the first material of index $n_2$ is suitable, i.e. high enough in the sense described above, that the radiation endows the light with a small-enough angle of entrance a into the space formed between the materials 9 and 10, i.e. one that allows the light to be guided substantially without loss along the light cavity thus generated in the space between the materials 9 and 10, by multiple and internal reflection at the interface between these two materials, as illustrated by the arrows $3_2$ to $3_6$ in FIG. 2. Such as shown in FIG. 2, on exiting from this cavity the light radiation $3_7$ is refracted by the surfaces of the glass sheet 5 of the glazing and collected, on exiting the section 11, by the objective of the camera 2 in a final direction of the radiation, which direction is shown schematically by the arrow $3_8$.

As also illustrated in FIG. 2, such a configuration permits the camera 2 to be tilted by an angle β toward the vertical with respect to its theoretical position behind the windshield, i.e. in the absence of the multilayer film 8 positioned in the section 11 of arrival of the beam to be collected.

As also explained above, such a configuration allows, in this way, the dimensions of the trapezoidal zone passed through by the beam on the windshield and therefore, in the end, the total area of the black zone 102 printed on the glazing to be very greatly limited. By way of example, it is possible to calculate that a tilt β of only 5° of the camera allows the area of said trapezoidal zone to be decreased by more than 50%. Thus, in FIG. 1, the trapezoidal zone according to the current configuration has been shown with a solid line and the trapezoidal zone in a configuration according to the present invention has been shown with a dashed line.

According to the invention, it therefore becomes possible to greatly limit the area of the black zone printed on the windshield or alternatively to place a higher number of cameras in the accessible zone of the windshield, in particular with a view to achieving stereoscopy or even in order to increase the number of the points of the road monitored and/or the number of functions such as described above.

The choice of the materials from which the layers 9 and 10 are made and their thicknesses is made according to prior-art techniques, depending in particular on the initial angle of incidence of the beam 3, i.e. on the zone on the road, in front (or behind) the vehicle, that it is desired to view, and with respect to the sought-after position of the camera 2 behind the windshield, and in particular to the sought-after angle β, such as was described above.

By way of nonlimiting example, the following materials may advantageously be used according to invention:
interlayer 6: "conventional" PVB of refractive index equal to about 1.48;
layer of material 9: material of refractive index $n_2$ comprised between 1.32 and 1.43. In particular, such a material may be chosen from optionally fluorinated, aliphatic urethane acrylate polymers such as those described above;
layer of material 10: refractive index $n_3$ comprised between 1.30 and 1.42, and the refractive index of which is close but slightly lower than that of the material 9, in the sense described above. In particular, such a material may be chosen from optionally fluorinated, aliphatic urethane acrylate polymers such as those described above.

The dimensions of the cut-out section 11 are normally small, considered with respect to the area of the windshield or of the glazing, and said section is arranged on the glazing substantially facing the ADAS camera(s) placed behind the glazing, in the passenger compartment.

By way of indication, the cut-out section 11 is as limited as possible in its dimensions and it may have any shape useful for the correct implementation of the present invention, in particular for the guidance of the light rays to the camera(s). For example, said cut-out has a rectangular shape, with dimensions of about 5 to 20 cm for the longest length and from 4 to 15 cm for the smallest length.

The shape and the dimensions of the cut-out section are also configured, according to prior-art techniques, to effectively and selectively collect all of the incident light radiation that a) passes through the windshield level with the bottom point of the cut-out section, b) is contained in an exterior (to the vehicle) solid-angle range, c) and originates from the zone, in front of the vehicle, that it is sought to capture via the objective 2 of the camera.

The invention claimed is:

1. A laminated motor-vehicle windshield comprising two glass sheets that are joined together by an interlayer made of a thermoplastic of refractive index $n_1$, wherein:
    said thermoplastic interlayer comprises a cut-out section in the upper portion of the windshield;
    said cut-out section is filled with a multilayer film forming a waveguide for guiding waves from a bottom point of entrance of light radiation on a face of the windshield exposed to the exterior of the vehicle to a top point of exit of said light radiation on a face of the windshield arranged toward a passenger compartment of the vehicle; and
    said multilayer film comprises layers:
        of a first material of refractive index $n_2$ such that $n_1 \geq n_2$ and
        of a second material that at least partially reflects the light radiation,
    said second material being placed on either side of the layer of first material in order to confine in the layer of first material said light radiation,
    wherein the light-reflecting second material is a material consisting of a thermoplastic of refractive index $n_3$, chosen in such a way that $n_2 > n_3$, and
    wherein the refractive index $n_3$ is lower than the refractive index $n_2$ by less than 0.05.

2. The laminated windshield as claimed in claim 1, wherein the refractive index $n_2$ is lower than the refractive index $n_1$.

3. The laminated windshield as claimed in claim 1, wherein the refractive index $n_2$ is lower than the refractive index $n_1$ by at least 0.05.

4. The laminated windshield as claimed in claim 1, wherein the interlayer is a PVB interlayer.

5. The laminated windshield as claimed in claim 1, wherein the first material is chosen from optionally fluorinated, aliphatic urethane acrylate polymers.

6. The laminated windshield as claimed in claim 1, wherein the second material is chosen from optionally fluorinated, aliphatic urethane acrylate polymers.

7. The laminated windshield as claimed in claim 1, wherein the light-reflecting second material is a stack consisting of at least one thin layer of a metal and/or of inorganic materials.

8. The laminated windshield as claimed in claim 7, wherein the light-reflecting second material consists of a silver layer or of a stack of thin layers comprising at least one silver layer.

9. The laminated windshield as claimed in claim 1, wherein said cut-out section is located in a central upper zone of the glazing.

10. The laminated windshield as claimed in claim 1, wherein said cut-out section is of rectangular shape.

11. A laminated motor-vehicle windshield comprising two glass sheets that are joined together by an interlayer made of a thermoplastic of refractive index $n_1$, wherein:
    said thermoplastic interlayer comprises a cut-out section in the upper portion of the windshield;
    said cut-out section is filled with a multilayer film forming a waveguide for guiding waves from a bottom point of entrance of light radiation on a face of the windshield exposed to the exterior of the vehicle to a top point of exit of said light radiation on a face of the windshield arranged toward a passenger compartment of the vehicle; and
    said multilayer film comprises layers:
        of a first material of refractive index $n_2$ such that $n_1 > n_2$ and
        of a second material that at least partially reflects the light radiation,
    said second material being placed on either side of the layer of first material in order to confine in the layer of first material said light radiation,
    wherein the interlayer is made of PVB, wherein the first material has a refractive index $n_2$ comprised between 1.32 and 1.43 and wherein a refractive index $n_3$ of the second material is comprised between 1.31 and 1.42.

12. The laminated windshield as claimed in claim 11, wherein the light-reflecting second material is a material consisting of a thermoplastic of refractive index $n_3$, chosen in such a way that $n_2 > n_3$.

13. A device for capturing, through a windshield, images issued from a zone of capture of light radiation from a bottom point of entrance of the light radiation on a face of a windshield which is exposed to the exterior of the vehicle to a top point of exit of said radiation on a face of the windshield which is arranged toward a passenger compartment of the vehicle, said device comprising:
    a camera comprising an objective and an image sensor; and
    a windshield;
    wherein said camera is placed in the passenger compartment behind said windshield level with said top point of exit of said radiation, so as to receive the light radiation issued from said capture zone, after the light radiation has passed through said windshield,
    wherein said windshield comprises two glass sheets that are joined together by an interlayer made of a thermoplastic of refractive index $n_1$, wherein:
        said thermoplastic interlayer comprises a cut-out section in the upper portion of the windshield;
        said cut-out section is filled with a multilayer film forming a waveguide for guiding waves from said bottom point of entrance of light radiation on the face of the windshield exposed to the exterior of the vehicle to said top point of exit of said light radiation on the face of the windshield arranged toward the passenger compartment of the vehicle; and
        said multilayer film comprises layers:
            of a first material of refractive index $n_2$ such that $n_1 > n_2$ and
            of a second material that at least partially reflects the light radiation,
    said second material being placed on either side of the layer of first material in order to confine; in the layer of first material said light radiation.

14. The device as claimed in claim 13, wherein the camera is an ADAS camera.

15. The device as claimed in claim 13, wherein the refractive index $n_2$ is lower than the refractive index $n_1$.

16. The device as claimed in claim 13, wherein the refractive index $n_2$ is lower than the refractive index $n_1$ by at least 0.05.

17. The device as claimed in claim 13, wherein the interlayer is a PVB interlayer.

18. The device as claimed in claim 13, wherein the first material is chosen from optionally fluorinated, aliphatic urethane acrylate polymers.

19. The device as claimed in claim 13, wherein the light-reflecting second material is a material consisting of a thermoplastic of refractive index $n_3$, chosen in such a way that $n_2 > n_3$.

20. The device as claimed in claim 13, wherein the light-reflecting second material is a stack consisting of at least one thin layer of a metal and/or of inorganic materials.

21. The device as claimed in claim 20, wherein the light-reflecting second material consists of a silver layer or of a stack of thin layers comprising at least one silver layer.

22. The device as claimed in claim 13, wherein said cut-out section is located in a central upper zone of the glazing.

23. The device as claimed in claim 13, wherein said cut-out section is of rectangular shape.

\* \* \* \* \*